US008628700B2

(12) United States Patent
Ito et al.

(10) Patent No.: US 8,628,700 B2
(45) Date of Patent: Jan. 14, 2014

(54) OPTICAL SHEET MANUFACTURING APPARATUS AND OPTICAL SHEET MANUFACTURING METHOD

(75) Inventors: Daisuke Ito, Miyagi (JP); Akihiro Horii, Miyagi (JP); Hiroshi Mizuno, Miyagi (JP); Noriyuki Hirai, Miyagi (JP); Shunichi Kajiya, Miyagi (JP); Yuu Miura, Miyagi (JP); Mitsuhiro Chida, Miyagi (JP); Masashi Ogawa, Miyagi (JP)

(73) Assignee: Dexerials Corporation, Tokyo (JP)

( * ) Notice: Subject to any disclaimer, the term of this patent is extended or adjusted under 35 U.S.C. 154(b) by 245 days.

(21) Appl. No.: 12/883,682

(22) Filed: Sep. 16, 2010

(65) Prior Publication Data

US 2011/0076394 A1    Mar. 31, 2011

(30) Foreign Application Priority Data

Sep. 25, 2009  (JP) ................ P2009-220438

(51) Int. Cl.
*B29D 11/00*    (2006.01)
(52) U.S. Cl.
USPC ............................ 264/1.6; 264/237; 264/284
(58) Field of Classification Search
USPC ............... 264/1.6, 237, 284; 425/373
See application file for complete search history.

(56) References Cited

U.S. PATENT DOCUMENTS

| | | | |
|---|---|---|---|
| 4,601,861 A * | 7/1986 | Pricone et al. ............ | 264/1.6 |
| 5,958,309 A * | 9/1999 | Fujii et al. ............... | 264/1.6 |
| 6,096,247 A | 8/2000 | Ulsh et al. | |
| 6,756,002 B2 * | 6/2004 | Fujii et al. ............... | 264/210.2 |
| 8,147,234 B2 * | 4/2012 | Ogino et al. ............. | 425/373 |
| 2004/0130057 A1 * | 7/2004 | Mehrabi et al. .......... | 264/171.13 |
| 2008/0001316 A1 * | 1/2008 | Jain et al. ................. | 264/1.1 |
| 2008/0223510 A1 | 9/2008 | Mizuno et al. | |
| 2009/0087506 A1 | 4/2009 | Hasegawa et al. | |

FOREIGN PATENT DOCUMENTS

| | | |
|---|---|---|
| DE | 1779 204 A1 | 9/1971 |
| JP | 2008-260268 | 10/2008 |

OTHER PUBLICATIONS

Chinese Patent Office, First Office Action mailed Dec. 10, 2012 in Chinese Patent Application No. 201010290060.3 w/English-language Translation.
Sep. 10, 2013 European Search Report issued in EP 10 00 9296.4.
Chinese Patent Office, Second Office Action mailed on Aug. 21, 2013 in Chinese Patent Application No. 201010290060.3 w/English-tanguage Translation.

* cited by examiner

*Primary Examiner* — James Sanders
(74) *Attorney, Agent, or Firm* — Oliff & Berridge, PLC (57) ABSTRACT

An optical sheet manufacturing apparatus includes a first master including a first three-dimensional structure, a second master including a second three-dimensional structure, a first processing unit to heat a first surface of a resin sheet to a first temperature and transfer the first three-dimensional structure onto the first surface heated, a second processing unit to cool the first surface to a second temperature lower than the first temperature, heat a second surface of the resin sheet to a third temperature higher than the second temperature, and transfer the second three-dimensional structure onto the second surface heated, a third processing unit to cool the second surface to a fourth temperature lower than the third temperature, a first conveyance mechanism to perform conveyance from the first processing unit to the second processing unit, and a second conveyance mechanism to perform conveyance from the second processing unit to the third processing unit.

5 Claims, 5 Drawing Sheets

OPTICAL SHEET MANUFACTURING APPARATUS AND OPTICAL SHEET MANUFACTURING METHOD

CROSS REFERENCES TO RELATED APPLICATIONS

The present application claims priority to Japanese Priority Patent Application JP 2009-220438 filed in the Japan Patent Office on Sep. 25, 2009, the entire content of which is hereby incorporated by reference.

BACKGROUND

The present application relates to a manufacturing apparatus and a manufacturing method of an optical sheet having translucency and three-dimensional structures on both sides thereof.

In recent years, the thickness of a liquid crystal display apparatus is being reduced. For the reduction in the thickness of a liquid crystal display apparatus, a backlight unit that illuminates a liquid crystal panel is necessary to be reduced in thickness. In view of this, a study is being made on the reduction in thickness of various optical sheets that constitute a backlight unit and a combination of optical sheets of different types.

The combination of different optical sheets of different types allows one optical sheet to have a plurality of optical functions, which can reduce the necessary number of optical sheets, to efficiently reduce the thickness of a backlight unit. As such an optical sheet, for example, an optical sheet having different shapes on the front surface and the back surface thereof is given. Further, as a manufacturing method of such an optical sheet, there has been known a method of using a pair of endless belts on each of which an embossed shape is formed (see, paragraph 0066 and FIG. 6 in Japanese Patent Application Laid-open No. 2008-260268 (hereinafter, referred to as Patent Document 1)). A resin sheet is conveyed between a heating and transfer process and a cooling and peeling process while being sandwiched between the pair of endless belts, thereby making it possible to form the embossed shape on the both sides of the resin sheet.

SUMMARY

In the manufacturing method of the optical sheet disclosed in Patent Document 1, the shape is given on the both sides of the resin sheet by the pair of endless belts, and then the pair of endless belts is simultaneously cooled, thereby peeling the belts from the resin sheet. Therefore, when a crinkle is generated on the endless belts due to a thermal expansion difference between a heating unit and a cooling unit, it is difficult to sufficiently cool the resin sheet and stably peel the resin sheet from the endless belts. For this reason, by the manufacturing method disclosed in Patent Document 1, it may be impossible to stably form the three-dimensional shape excellent in shape accuracy on the both surfaces of the resin sheet, and it is difficult to form the three-dimensional structures having different shapes on the respective surfaces with high accuracy.

In view of the above-mentioned circumstances, it is desirable to provide an optical sheet manufacturing apparatus and an optical sheet manufacturing method capable of forming a three-dimensional structure on each of an optical sheet with high accuracy.

According to an embodiment, there is provided an optical sheet manufacturing apparatus including a first master, a second master, a first processing unit, a second processing unit, a third processing unit, a first conveyance mechanism, and a second conveyance mechanism.

The first master includes a first three-dimensional structure.

The second master includes a second three-dimensional structure.

The first processing unit heats a first surface of a resin sheet to a first temperature and transfers the first three-dimensional structure onto the first surface heated.

The second processing unit cools the first surface to a second temperature lower than the first temperature, heats a second surface of the resin sheet to a third temperature higher than the second temperature, and transfers the second three-dimensional structure onto the second surface heated. The second surface is a reverse side to the first surface.

The third processing unit cools the second surface to a fourth temperature lower than the third temperature.

The first conveyance mechanism conveys the first master and the resin sheet from the first processing unit to the second processing unit.

The second conveyance mechanism conveys the second master and the resin sheet from the second processing unit to the third processing unit.

After the first three-dimensional structure is transferred onto the first surface of the resin sheet in the first processing unit, the first master is conveyed to the second processing unit without being peeled from the first surface. Then, during the cooling of the first surface in the second processing unit, the second three-dimensional structure is transferred onto the second surface of the resin sheet. On the other hand, after the second three-dimensional structure is transferred onto the second surface of the resin sheet in the second processing unit, the second master is conveyed to the third processing unit without peeling from the second surface.

By the optical sheet manufacturing apparatus, after the three-dimensional structure is transferred onto the first surface of the resin sheet, the three-dimensional structure is transferred onto the second surface of the resin sheet while cooling the first surface of the resin sheet. Therefore, it is possible to perform the shape transfer onto the second surface with high accuracy while maintaining the sufficient cooling operation on the first surface. In addition, since the cooling process for the first surface and the cooling process for the second surface are performed in the different positions, the sufficient cooling effect can be secured with respect to the respective surfaces, with the result that the stable peeling operation with respect to the first and second masters can be implemented.

Meanwhile, by transferring the second three-dimensional structure onto the second surface without peeling the first master from the first surface, the shape of the first three-dimensional structure transferred onto the first surface can be maintained with high accuracy. In addition, the temperature difference can be set between the first master and the second master, thereby making it easy to move the resin sheet from the first master as the low-temperature side to the second master as the high-temperature side. As a result, it is possible to transfer the second three-dimensional structure onto the second surface with high accuracy.

In this way, by the optical sheet manufacturing apparatus, the three-dimensional structures having the excellent shape accuracy can be stably formed on the respective surfaces of the resin sheet, with the result that an optical sheet having desired optical characteristics can be manufactured with high accuracy.

The first processing unit may include a first heating roller and a first nip roller. The first heating roller is capable of being heated to the first temperature. The first nip roller is opposed to the first heating roller with the first master being sandwiched therebetween and is capable of nipping the resin sheet with the first master.

In this case, the second processing unit may include a first cooling roller and a second heating roller. The first cooling roller is capable of being cooled to the second temperature. The second heating roller is capable of being heated to the third temperature, is opposed to the first cooling roller with the first master and the second master being sandwiched therebetween, and is capable of nipping the resin sheet with the first master and the second master.

In the optical sheet manufacturing apparatus, the first and second processing units can be constituted by combining the first and second heating rollers and the first cooling roller. With this structure, by conveying the first and second masters between the heating rollers and the cooling roller, it is possible to easily manufacture the optical sheet on both surfaces of which the three-dimensional structures are formed with high accuracy.

The first master may be formed of a first endless belt that has the first three-dimensional structure on an outer circumferential surface thereof and is run between the first heating roller and the first cooling roller. In this case, the first conveyance mechanism includes a first drive source that performs a rotary drive on at least one of the first heating roller and the first cooling roller.

In the optical sheet manufacturing apparatus, the first drive source can rotate the first endless belt between the first heating roller and the first cooling roller. With this structure, the resin sheet can be continuously conveyed between the first heating roller and the first cooling roller.

The second processing unit may nip the resin sheet between the first cooling roller and the second heating roller and subsequently peel the resin sheet from the first endless belt.

With this structure, it is possible to easily move the resin sheet from the first endless belt to the second master while maintaining the shape of the three-dimensional structure with high accuracy, which is formed on the first surface of the resin sheet.

The second processing unit may bring the resin sheet into contact with the first cooling roller and subsequently nip the resin sheet between the first cooling roller and the second heating roller.

With this structure, the cooling time period can be secured for the resin sheet on the first cooling roller, which can enhance the peeling performance of the resin sheet from the first endless belt.

In this case, the center of rotation of the second heating roller may be located on an extended straight line that links the center of rotation of the first heating roller with the center of rotation of the first cooling roller, or may not be located thereon.

The third processing unit may include a second cooling roller and a second nip roller. The second cooling roller is capable of being cooled to the fourth temperature. The second nip roller is opposed to the second cooling roller with the second master being sandwiched therebetween and is capable of nipping the resin sheet with the second master.

With this structure, the peeling performance of the resin sheet from the second master can be enhanced.

The second master may be formed of a second endless belt that has the second three-dimensional structure on an outer circumferential surface thereof and is run between the second heating roller and the second cooling roller. In this case, the second conveyance mechanism includes a second drive source that performs a rotary drive on at least one of the second heating roller and the second cooling roller.

In the optical sheet manufacturing apparatus, the second drive source can rotate the second endless belt between the second heating roller and the second cooling roller. With this structure, the resin sheet can be continuously conveyed between the second heating roller and the second cooling roller.

At least one of the first three-dimensional structure and the second three-dimensional structure may have a prism shape.

With this structure, it is possible to manufacture an optical sheet having the prism-shaped three-dimensional structure on at least one surface thereof.

At least one of the first three-dimensional structure and the second three-dimensional structure has a curved surface shape.

With this structure, it is possible to manufacture an optical sheet having the curve-shaped three-dimensional structure on at least one surface thereof.

The first temperature and the third temperature may be set to be higher than a glass-transition point of the resin sheet. Further, the second temperature and the fourth temperature may be set to be lower than the glass-transition point of the resin sheet.

With this structure, the three-dimensional structures can be transferred onto the first and second surfaces of the resin sheet with high accuracy, and the first and second masters can be properly peeled from the first and second surfaces, respectively.

According to another embodiment, there is provided an optical sheet manufacturing method including forming a first three-dimensional structure on a first surface of a resin sheet using a first master heated to a first temperature. While cooling the first surface to a second temperature lower than the first temperature, a second three-dimensional structure is formed on a second surface of the resin sheet using a second master heated to a third temperature higher than the second temperature. The second surface is a reverse side to the first surface. The second surface is cooled to a fourth temperature lower than the third temperature.

By the optical sheet manufacturing method, the three-dimensional structure is transferred onto the second surface of the resin sheet while cooling the first surface of the resin sheet, after the three-dimensional structure is transferred onto the first surface. Therefore, it is possible to perform the shape transfer with respect to the second surface with high accuracy while maintaining the sufficient cooling operation on the first surface. In addition, since the cooling process for the first surface and the cooling process for the second surface are performed in the different positions, the sufficient cooling effect can be secured with respect to the respective surfaces, with the result that the stable peeling operation with respect to the first and second masters can be implemented.

The second three-dimensional structure is formed on the second surface, and the first master is subsequently peeled from the first surface, with the result that the shape of the first three-dimensional structure transferred onto the first surface can be maintained with high accuracy. Further, in this case, the temperature difference can be set between the first master and the second master, thereby making it easy to move the resin sheet from the first master as the low-temperature side to the second master as the high-temperature side. As a result, it is possible to transfer the second three-dimensional structure onto the second surface with high accuracy. Thus, by the optical sheet manufacturing method, the three-dimensional structures having the excellent shape accuracy can be stably formed on the respective surfaces of the resin sheet, with the result that an optical sheet having desired optical characteristics can be manufactured with high accuracy.

It is possible to use, as the first master, a first endless belt, on a surface of which a shape corresponding to the first three-dimensional structure is formed, and which is run between a first heating roller and a first cooling roller. The first heating roller is capable of being heated to the first temperature, and the first cooling roller is capable of being cooled to the second temperature. Further, it is possible to use, as the second master, a second endless belt, on a surface of which a shape corresponding to the second three-dimensional structure is formed, and which is run between a second heating roller and a second cooling roller. The second heating roller is capable of being heated to the third temperature, and the second cooling roller is capable of being cooled to the fourth temperature.

With this structure, it is possible to rotate the first endless belt between the first heating roller and the first cooling roller. Thus, the resin sheet can be continuously conveyed between the first heating roller and the first cooling roller. In addition, it is possible to rotate the second endless belt between the second heating roller and the second cooling roller. Thus, the resin sheet can be continuously conveyed between the second heating roller and the second cooling roller.

The resin sheet may be made of a transparent thermoplastic resin.

By the optical sheet manufacturing method, it is possible to manufacture an optical sheet having desired three-dimensional structures on the respective surfaces thereof with high accuracy while maintaining the transparency demanded as the optical sheet.

The resin sheet may be made of a crystalline resin.

By the optical sheet manufacturing method, the crystallization with the heating process with respect to the resin sheet can be suppressed, with the result that whitening or birefringence can be effectively prevented, thereby making it possible to manufacture an optical sheet having excellent optical characteristics.

According to the embodiments, the three-dimensional structures having the excellent shape accuracy can be stably formed on the respective surfaces of the resin sheet. Thus, it is possible to manufacture the optical sheet having the desired optical characteristics with high accuracy.

In addition, according to the embodiments, it is possible to obtain the optical sheet on the respective surfaces of which the three-dimensional structures having the excellent shape accuracy are formed.

These and other objects, features and advantages of the present application will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments will be described with reference to the drawings.

<First Embodiment>

Figure 1:
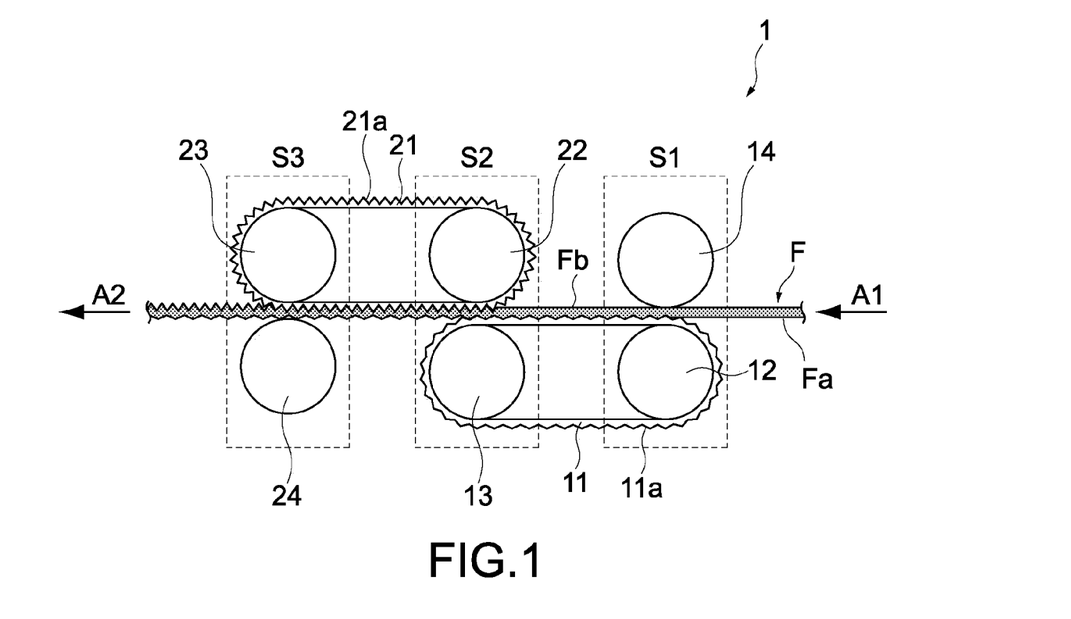
FIG. 1 is a schematic structural diagram showing an optical sheet manufacturing apparatus according to an embodiment.

FIG. 1 is a schematic diagram showing an optical sheet manufacturing apparatus (hereinafter, referred to as sheet manufacturing apparatus) according to an embodiment. Hereinafter, the overall structure of the sheet manufacturing apparatus will be described.

(Sheet Manufacturing Apparatus)

A sheet manufacturing apparatus 1 includes a first belt 11 (first master) and a second belt 21 (second master). The first belt 11 has a first three-dimensional (hereinafter, abbreviated as 3-D) structure 11a, and the second belt 21 has a second 3-D structure 21a. The sheet manufacturing apparatus 1 conveys a resin sheet F with the first and second belts 11 and 21, thereby sequentially transferring the first and second 3-D structures 11a and 21a onto a first surface (lower surface in FIG. 1) Fa of the resin sheet F and a second surface (upper surface in FIG. 1) Fb on the other side thereof, respectively.

The first belt 11 is run between a first heating roller 12 and a first cooling roller 13 that are disposed at a predetermined interval. At least one of the first heating roller 12 and the first cooling roller 13 is subjected to a rotary drive by a drive force transmission mechanism (first conveyor mechanism) including a drive source such as a motor (not shown), with the result that the first belt 11 is conveyed in a certain direction.

The first heating roller 12 can be heated to a temperature (first temperature) higher than a glass-transition point (Tg) of the resin sheet F. The first belt 11 is heated to the first temperature when passing over the first heating roller 12. The second cooling roller 13 can be cooled to a temperature (second temperature) lower than the glass-transition point of the resin sheet F. The first belt 11 is cooled to the second temperature when passing over the first cooling roller 13.

The second belt 21 is run between a second heating roller 22 and a second cooling roller 23 that are disposed at a predetermined interval. At least one of the second heating roller 22 and the second cooling roller 23 is subjected to a rotary drive by a drive force transmission mechanism (second conveyor mechanism) including a drive source such as a motor (not shown), with the result that the second belt 21 is conveyed in a certain direction.

The second heating roller 22 can be heated to a temperature (third temperature) higher than the glass-transition point of the resin sheet F. The second belt 21 is heated to third temperature when passing over the second heating roller 22. The second cooling roller 23 can be cooled to a temperature (fourth temperature) lower than the glass-transition point of the resin sheet F. The second belt 21 is cooled to the fourth temperature when passing over the second cooling roller 23.

The first belt 11 and the second belt 21 are disposed so that the resin sheet F can be linearly conveyed in a horizontal direction indicated by the arrows A1 and A2 of FIG. 1. At this time, as shown in FIG. 1, the first cooling roller 13 and the second heating roller 22 are opposed to each other so that the resin sheet F can be sandwiched between the first and second belts 11 and 21. The drive sources described above control conveyance speeds of the first and second belts 11 and 21 so that the belts 11 and 21 are conveyed in synchronization with each other.

The sheet manufacturing apparatus 1 further includes a first nip roller 14 and a second nip roller 24. The first nip roller 14 is opposed to the first heating roller 12 with the first belt 11 being sandwiched therebetween, and can be rotated with the resin sheet F being sandwiched between the first nip roller 14 and the first belt 11. The second nip roller 24 is opposed to the second cooling roller 23 with the second belt 21 being sandwiched therebetween, and can be rotated with the resin sheet F being sandwiched between the second nip roller 24 and the second belt 21.

The sheet manufacturing apparatus 1 structured as described above includes a first processing unit S1, a second processing unit S2, and a third processing unit S3. The first processing unit S1 processes the first surface Fa of the resin sheet F. The second processing unit S2 processes the second surface Fb while cooling the first surface Fa of the resin sheet F. The third processing unit S3 cools the second surface Fb of the resin sheet F. The first heating roller 12 and the first nip roller 14 belong to the first processing unit S1. The first cooling roller 13 and the second heating roller 22 belong to the second processing unit S2. The second cooling roller 23 and the second nip roller 24 belong to the third processing unit S3. The first belt 11 is conveyed between the first processing unit S1 and the second processing unit S2 with the resin sheet F. The second belt 21 is conveyed between the second processing unit S2 and the third processing unit S3 with the resin sheet F.

In this embodiment, the first and second belts 11 and 21 are formed of metallic endless belts having excellent heat conductivity. The first and second 3-D structures 11a and 21a are formed on outer circumferential surfaces of the first belt 11 and the second belt 21, respectively. Examples of a manufacturing method of the belts 11 and 21 having the structures described above include an electroforming process of nickel steel with respect to a cylindrical resin master having an embossed shape on an inner side thereof and a direct cutting process with respect to the outer circumferential surface of the belt that is wound around a cylindrical roll.

The group of rollers between which the belts 11 and 21 are run is not limited to the heating rollers 12 and 22 and the cooling rollers 13 and 23. For example, a tension roller that controls the tension of the belts 11 and 21 or a pinch roller that fixes the tension of the belts 11 and 21 between areas may be provided, for example. In addition, the heating rollers and the cooling rollers between which the belts 11 and 21 are run may be increased in number when necessary.

The master for transferring the 3-D structures onto the surfaces Fa and Fb of the resin sheet F is not limited to the endless belts as described above. For example, a plate-like master having a shape corresponding to the 3-D structure may be reciprocated between the processing units. Alternatively, a pair of masters may be caused to pass through the first to third processing units with the resin sheet F while being in contact with the both surfaces of the resin sheet F.

The first and second 3-D structures 11a and 21a are set to have an appropriate geometric shape (embossed shape) in accordance with a demanded surface shape of a resin sheet. For example, a prism having a curved shape or a triangular shape in cross-section, a lens shape, a linearly tapered shape, or a dotted pattern of rectangles or circles may be used. The sizes of the 3-D structures 11a and 21a are not particularly limited, and may be minute. The shapes and the sizes of the 3-D structures 11a and 21a may be the same or different. Further, the 3-D structures 11a and 21a may have a composite structure so that two or more kinds of 3-D structures can be formed on the same surface. For example, the 3-D structure can be formed so that a linearly tapered portion and a triangular prism portion are disposed at a certain pitch. The shape is not limited to the geometric shape as described above. The 3-D structures 11a and 21a may have a random uneven shape (texture) formed on the surface of the resin sheet, for example.

For example, as the 3-D structures 11a and 21a, a periodic structure such as a lens array and a prism array having a ridge line in a certain direction can be used. In this case, the ridge-line direction is set to a width direction (TD (transverse direction)) of the resin sheet F, but is not limited to this. The ridge-line direction may be set to a running direction (MD (machine direction)) of the resin sheet F. In addition, to enhance a peeling performance of the resin sheet F from the belts 11 and 21, a peeling agent may be applied on the surfaces of the belts 11 and 21. As the peeling agent, a fluorine-based resin or a silicone-based resin can be used, for example.

In the first and second heating rollers 12 and 22, a heating source such as a heater and a circulating path of a heating medium is provided. The surface temperatures of the heating rollers 12 and 22 are set to the temperatures (first temperature and third temperature) higher than a softening temperature of the resin sheet F, that is, a glass-transition point of the resin sheet F. Therefore, contact areas of the belts 11 and 21 with the heating rollers 12 and 22 are also heated to the above-mentioned temperatures, and the heating process can be performed on the resin sheet F at those positions.

The first and third temperatures are not particularly limited, and may be set to Tg+60° C. or more and Tg+90° C. or less. If the surface temperatures of the heating rollers 12 and 22 are low, it may be impossible to obtain desirable transfer accuracy of the embossed shape with respect to the resin sheet F. In contrast, if the surface temperatures of the heating rollers 12 and 22 are too high, in the case where the resin sheet F is formed of a crystalline resin whose amorphous state is difficult to be maintained, the crystallization of the resin sheet F is excessively promoted, which significantly deteriorates the transparency due to whitening. The first and third temperatures may be the same or may be different.

In the first and second cooling rollers 13 and 23, a cooling source such as a circulating path of a cooling medium is provided. The surface temperatures of the cooling rollers 13 and 23 are set to temperatures (second temperature and fourth temperature) lower than the glass-transition point of the resin sheet F. Therefore, contact areas of the belts 11 and 21 with the cooling rollers 13 and 23 are also cooled to the above-mentioned temperatures, and the cooling process can be performed on the resin sheet F at those positions.

The second and fourth temperatures are not particularly limited, and are set to be low to such an extent that the resin sheet F can be properly peeled from the belts 11 and 21. The second and fourth temperatures can be set to be equal to or lower than 30° C., for example. The second and fourth temperatures may be the same or may be different.

As the resin sheet F, a transparent thermoplastic resin is used. The resin sheet F may be a crystalline resin or non-crystalline resin. As the crystalline resin, polyethylene terephthalate (PET), polyethylene naphthalate (PEN), or a PET-PEN copolymer may be used, for example. The crystalline resin includes an amorphous state. As the non-crystalline resin, polycarbonate (PC), a methacrylate resin (PMMA), or the like may be used. In this embodiment, the method is used in which the resin sheet F is formed into a long, band-like shape and is continuously supplied to the sheet manufacturing apparatus 1. In addition to this, a method may be used in which the resin sheet F is cut into a predetermined size to obtain sheets, and the sheets are sequentially supplied to the sheet manufacturing apparatus 1.

Here, in the case where the crystalline resin is used as the resin sheet, there is a fear that the resin sheet F may be whitened before and after the embossing process. This is because random crystallization is caused in the resin sheet. If the whitening of resin sheet is caused, a light-beam transmission rate is sharply reduced, with the result that the resin sheet hardly endures the use as the optical sheet. To prevent the whitening of the resin sheet, rapidly cooling the resin sheet after the embossing process is effective. A cooling speed of the resin sheet can be adjusted based on the distance between the heating roller and the cooling roller, the conveyance speed (line speed) of the resin sheet, the thickness of the resin sheet, or the like. The cooling speed of the resin sheet can be set to 5° C./second or more and 40° C./second or less.

In addition, as the resin sheet F, a transparent resin material having a relatively high intrinsic birefringence may be used. With the use of such a resin material, the birefringence of an optical sheet manufactured can be suppressed to be relatively small by the sheet manufacturing apparatus 1 of this embodiment. For example, with the use of a material having an intrinsic birefringence of 0.05 or more, it is possible to manufacture a transparent sheet having a birefringence of 0.01 or less. As the resin material of this type, polycarbonate, polyethylene terephthalate, or polyethylene naphthalate can be used, for example. As a result, it is possible to obtain a transparent resin sheet having the 3-D structures on the respective surfaces and having excellent optical isotropy by using a relatively inexpensive resin material.

(Sheet Manufacturing Method)

Next, a description will be given on an optical sheet manufacturing method according to this embodiment using the sheet manufacturing apparatus 1 structured as described above.

The resin sheet F is supplied between the first belt 11 and the first nip roller 14 in the direction indicated by the arrow A1 of FIG. 1. In the first processing unit S1, the resin sheet F is heated to the first temperature that is higher than the glass-transition point on the first heating roller 12, and is sandwiched by pressure between the first belt 11 and the first nip roller 14. As a result, the first 3-D structure 11a is transferred onto the first surface Fa of the resin sheet F. The resin sheet F onto which the first 3-D structure 11a is transferred is adhered to the first belt 11, and is conveyed with the first belt 11 from the first processing unit S1 to the second processing unit S2.

Subsequently, in the second processing unit S2, the resin sheet F is cooled to the second temperature that is lower than the glass-transition point with the first belt 11 on the first cooling roller 13. At the same time, the resin sheet F is heated to the third temperature that is higher than the glass-transition point with the second belt 21 on the second heating roller 22, and is sandwiched by pressure between the first belt 11 and the second belt 21. As a result, the second 3-D structure 21a is transferred onto the second surface Fb of the resin sheet F. The resin sheet F onto which the second 3-D structure 21a is transferred is peeled from the first belt 11 while being adhered to the second belt 21, and is subsequently conveyed with the second belt 21 from the second processing unit S2 to the third processing unit S3.

Subsequently, in the third processing unit S3, the resin sheet F is cooled to the fourth temperature that is lower than the glass-transition point with the belt 21 on the second cooling roller 23. Further, the resin sheet F is peeled from the second belt 21, and is discharged from a gap between the second cooling roller 23 and the second nip roller 24 in the direction indicated by the arrow A2 of FIG. 1.

The resin sheet F that has passed through the sheet manufacturing apparatus 1 is cut into a predetermined size in the following process, with the result that an optical sheet having the 3-D structures on both surfaces thereof can be manufactured.

As described above, after transferring the first 3-D structure 11a onto the first surface Fa of the resin sheet F in the first processing unit 51, the first belt 11 is conveyed to the second processing unit S2 without being peeled from the first surface Fa. Then, during the cooling of the first surface Fa in the second processing unit S2, the second 3-D structure 21a is transferred onto the second surface Fb of the resin sheet F. On the other hand, after transferring the second 3-D structure 21a onto the second surface Fb of the resin sheet F in the second processing unit S2, the second belt 21 is conveyed to the third processing unit S3 without being peeled from the second surface Fb.

Thus, according to this embodiment, after the 3-D structure is transferred onto the first surface Fa of the resin sheet F, the 3-D structure is transferred onto the second surface Fb of the resin sheet F with the first surface Fa being cooled. Therefore, the shape transfer can be performed with high accuracy on the second surface Fb while a sufficient cooling operation is secured with respect to the first surface Fa. In addition, the cooling process of the first surface Fa and the cooling process of the second surface Fb are performed at different positions. Thus, the sufficient cooling effect can be secured with respect to the respective surfaces, and the stable peeling operation can be implemented with respect to the first and second belts 11 and 21.

On the other hand, by transferring the second 3-D structure 21a onto the second surface Fb without peeling the first belt 11 from the first surface Fa, the shape of the first 3-D structure 11a transferred onto the first surface Fa can be maintained with high accuracy. Further, in the second processing unit S2, the temperature difference can be generated between the first belt 11 and the second belt 21, and therefore the resin sheet can be easily moved from the first belt 11 on the low-temperature side to the second belt 21 on the high-temperature side. As a result, it is possible to transfer the second 3-D structure 21a onto the second surface Fb with high accuracy.

As described above, according to this embodiment, the 3-D structures having excellent shape accuracy can be stably formed on the respective surfaces of the resin sheet. Therefore, it is possible to manufacture the optical sheet having desired optical characteristics.

Further, in this embodiment, the first heating roller 12 and the first nip roller 14 constitute the first processing unit S1, and the second heating roller 22 and the first cooling roller 13 constitute the second processing unit S2. In addition, the second cooling roller 23 and the second nip roller 24 constitute the third processing unit S3. Accordingly, the first and second belts 11 and 21 are caused to run between those rollers, with the result that the conveyance system that conveys the resin sheet F from the first processing unit S1 to the second and third processing units S2 and S3 can be easily formed.

In particular, the first and second belts 11 and 12 are formed of the endless belts, and therefore can be rotated around the heating roller 12 and the cooling roller 13 and around the heating roller 22 and the cooling roller 23, respectively. With this structure, the resin sheet F can be continuously conveyed between the rollers.

<Second Embodiment>

Figure 2:
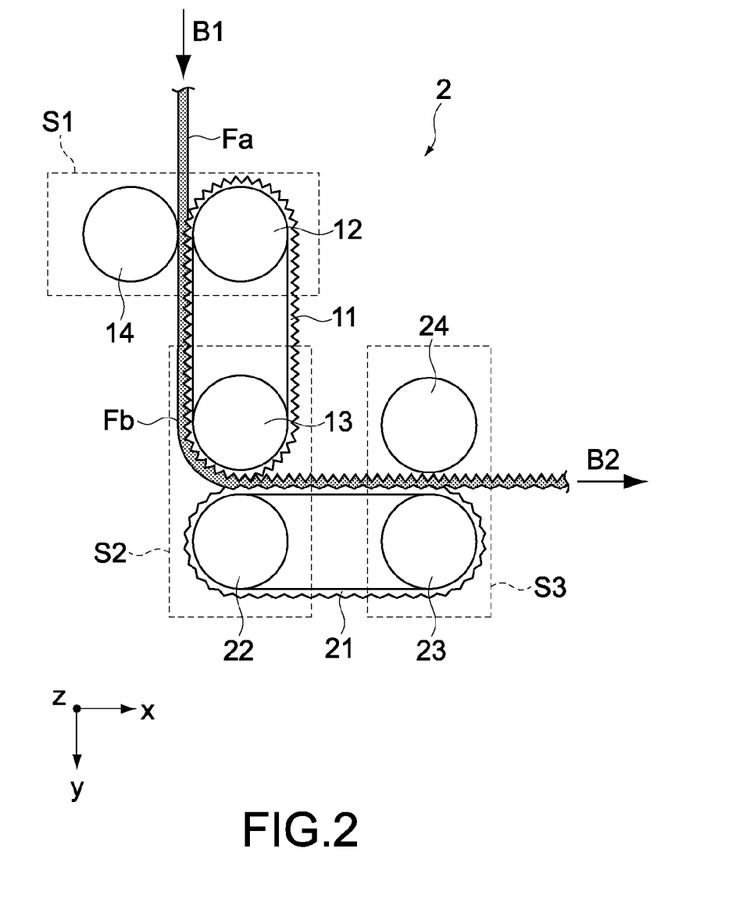
FIG. 2 is a schematic structural diagram showing an optical sheet manufacturing apparatus according to another embodiment.

FIG. 2 is a schematic diagram showing an optical sheet manufacturing apparatus (hereinafter, referred to as sheet manufacturing apparatus) according to a second embodiment. In FIG. 2, components corresponding to those of the first embodiment are denoted by the same reference numerals or symbols, and their detailed descriptions will be omitted.

A sheet manufacturing apparatus 2 of this embodiment is different from the sheet manufacturing apparatus 1 according to the first embodiment in layout of the first and second heating rollers 12 and 22 and the first and second cooling rollers 13 and 23. Specifically, in the sheet manufacturing apparatus 2 of this embodiment, the center of rotation of the second heating roller 22 lies on an extended line that links the center of rotation of the first heating roller 12 and the center of rotation of the first cooling roller 13 with each other.

The first belt 11 is run between the first heating roller 12 and the first cooling roller 13, and the second belt 21 is run between the second heating roller 22 and the second cooling roller 23. The first processing unit S1 is constituted of the first heating roller 12 and the first nip roller 14, and the second processing unit S2 is constituted of the first cooling roller 13 and the second heating roller 22. Further, the third processing unit S3 is constituted of the second cooling roller 23 and the second nip roller 24. Those structures are the same as those of the sheet manufacturing apparatus 1 according to the first embodiment.

The resin sheet F is supplied to the first processing unit S1 in a direction (y-axis direction) indicated by the arrow B1 of FIG. 2. In the first processing unit S1, the first surface Fa of the resin sheet F is heated to the first temperature on the first heating roller 12, and the first 3-D structure 11a formed on the first belt 11 is transferred thereon.

The resin sheet F is conveyed to the second processing unit S2 with the first belt 11 and is cooled to the second temperature on the first cooling roller 13. In addition, the second surface Fb of the resin sheet F is heated to the third temperature on the second heating roller 22, and the second 3-D structure 21a formed on the second belt 21 is transferred thereon. The resin sheet F is peeled from the first belt 11 and is conveyed to the third processing unit S3 with the second belt 21.

In the third processing unit S3, the resin sheet F is cooled to the fourth temperature on the second cooling roller 23 and is peeled from the second belt 21, to be discharged in a direction (x-axis direction) indicated by the arrow B2.

As described above, an optical sheet obtained by transferring the first and second 3-D structures 11a and 21a onto the first and second surfaces Fa and Fb of the resin sheet F, respectively, is manufactured. According to this embodiment, the same effect as in the first embodiment can be obtained.

In this embodiment, in particular, by disposing the second heating roller 22 as described above, the conveyance direction of the resin sheet F is changed from the y-axis direction to the x-axis direction in the second processing unit S2. At this time, the resin sheet F is brought into contact with the first cooling roller 13 and then sandwiched between the first cooling roller 13 and the second heating roller 22. Therefore, the degree of contact of the resin sheet F with respect to the first cooling roller 13 is large, which can increase a cooling efficiency of the resin sheet F by the first cooling roller 13. In addition, since the shape transfer onto the second surface Fb is performed by the second belt 21, after the first surface Fa of the resin sheet F is sufficiently cooled, it is possible to sufficiently secure the cooling time period with respect to the first surface Fa, with the result that the peeling performance of the resin sheet F from the first belt 11 can be increased.

It should be noted that the position of the center of rotation of the second heating roller 22 is not limited to the position on the extended line described in the above example. Specifically, for example, the rollers are disposed so that a straight line that links the center of rotation of the second heating roller 22 and the center of rotation of the second cooling roller 23 passes the center of rotation of the first heating roller 12 and the center of rotation of the first cooling roller 13, with the result that the same effect as described above can be obtained.

<Third Embodiment>

Next, with reference to FIGS. 3 to 5, an optical sheet according to a third embodiment will be described.

Figure 3:
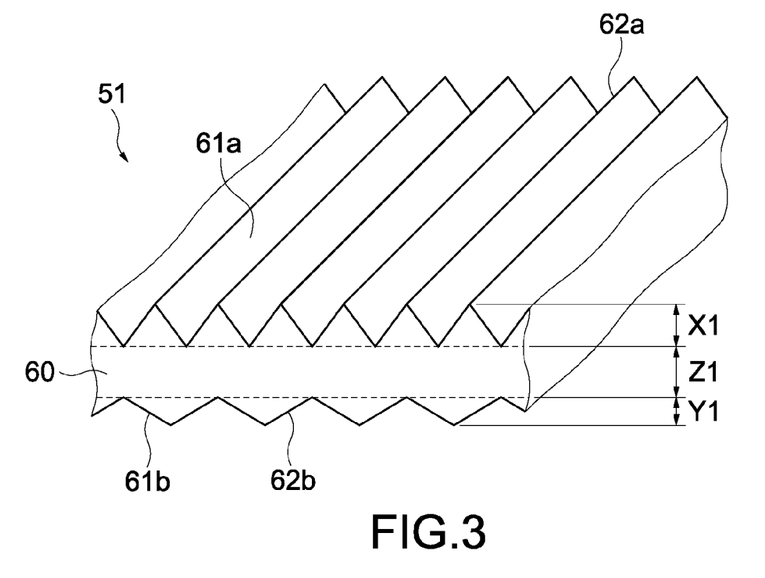
FIG. 3 is a schematic perspective view showing a main part of an optical sheet according to another embodiment.
Figure 4:
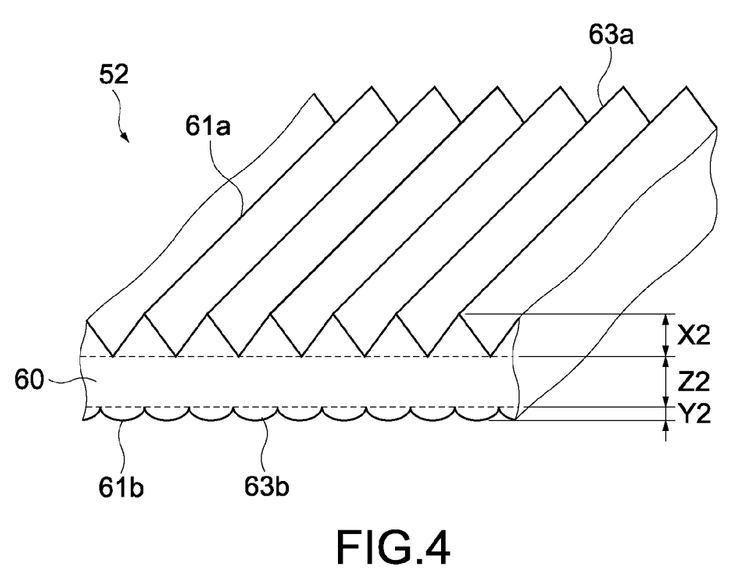
FIG. 4 is a schematic perspective view showing a main part of an optical sheet according to an embodiment.

An optical sheet 51 shown in FIG. 3 includes a sheet main body 60, a first 3-D structure 62a, and a second 3-D structure 62b. The sheet main body 60 has a first surface 61a on an upper surface side and a second surface 61b on a lower surface side. The first 3-D structure 62a is formed on the first surface 61a, and the second 3-D structure 62b is formed on the second surface 61b. The optical sheet 51 is made of a transparent resin material having a single layer. Therefore, the first and second 3-D structures 62a and 62b partly constitute the sheet main body 60 and form interfaces between the sheet main body 60 and an air layer.

The optical sheet 51 of this embodiment is obtained by cutting the resin sheet F that has been subjected to the shape process by the sheet manufacturing apparatus 1 or 2 into a predetermined size. The first 3-D structure 62a is formed by transferring the second 3-D structure 21a formed on the second belt 21 onto the first surface 61a (second surface Fb), for example. The second 3-D structure 62b is formed by transferring the first 3-D structure 11a formed on the first belt 11 onto the second surface 61b (first surface Fa), for example.

The first 3-D structure 62a and the second 3-D structure 62b have different forms from each other in this embodiment, although the 3-D structures 62a and 62b may have the same form. By the sheet manufacturing apparatus described above, the optical sheet whose surfaces have different shapes can be formed with high accuracy. In the optical sheet 51 of this embodiment, the first 3-D structure 62a and the second 3-D structure 62b have a shape in which prism elements each having a triangular cross-section are arranged in a certain direction. The prism elements of the first and second 3-D structures 62a and 62b are different in arrangement pitch (distance between ridges adjacent to each other) and height thereof (distance between a peak and a valley of the prism in a sheet thickness direction). Specifically, the cross-sectional shape of the first 3-D structure 62a is an approximately right triangle, and the cross-sectional shape of the second 3-D structure 62b is an obtuse-angled isosceles triangle.

The optical sheet 51 of this embodiment is structured so that X1, Y1, and Z1 satisfy the following relationships:

$$0.1 \leq X1/Z1 \leq 3 \tag{1}$$

$$0.01 \leq Y1/Z1 \leq 3 \tag{2}$$

$$(X1+Y1)/Z1 \leq 4 \tag{3}$$

where X1 represents the height of the first 3-D structure 62a, Y1 represents the height of the second 3-D structure 62b, and Z1 represents the thickness obtained by subtracting the sum of X1 and Y1 from the thickness of the sheet main body 60.

If the value of X1/Z1 and the value of Y1/Z1 become larger than 3, it may be impossible for the resin sheet F to sufficiently absorb transfer pressures given by the belts 11 and 21 at the time when the first and second 3-D structures 62a and 62b are formed, which may impair the shape accuracy of the 3-D structures 62a and 62b. In addition, if the value of (X1+Y1)/Z1 becomes larger than 4, it may be impossible to secure the strength as the optical sheet.

The thickness of the optical sheet 51 (sheet main body 60) can be set to 10 μm or more and 2000 μm or less. By the sheet manufacturing apparatus 1 or 2, it is possible to manufacture, with high accuracy, the optical sheet having the 3-D structures that satisfy the above expressions (1) to (3) within the thickness range.

The resin material that forms the sheet main body 60 is not particularly limited, and the various resin materials described above can be used therefor. In this embodiment, the resin material whose intrinsic birefringence is 0.05 or more is used. The intrinsic birefringence herein refers to a maximum birefringence that the resin material can have. For example, polycarbonate (PC), polyethylene terephthalate (PET), polyethylene naphthalate (PEN), or the like can be used as the resin material. According to this embodiment, with the use of the sheet manufacturing apparatus 1 or 2, the crystallization of the resin sheet at the time of forming the 3-D structures can be suppressed. Therefore, even if such a kind of material is used, the resin sheet having excellent optical isotropy (whose birefringence is 0.01 or less) can be manufactured.

The optical sheet 51 of this embodiment can be used as a part of an optical sheet that constitutes a backlight unit for a liquid crystal display apparatus. In this case, the optical sheet 51 is incorporated in the backlight unit with the second surface 61b side being set as a light incident surface side and the first surface 61a side being set as a light exit surface side. The 3-D structures 62b and 62a formed on the respective surfaces each have the triangular cross-section and therefore exert a certain light deflective operation including a light collective function on the respective surfaces. Thus, it is possible to implement functions of the two kinds of optical sheets in one optical sheet, which can contribute to the reduction in thickness of the backlight unit and the liquid crystal display apparatus.

<Fourth Embodiment>

The first and second 3-D structures 62a and 62b are not limited to have the combination of the prism shapes of different types as described above, and can have a combination of other geometric shapes. For example, an optical sheet 52 shown in FIG. 4 has a 3-D structure 63a having triangular cross-sections as a 3-D structure formed on the first surface 61a and has a 3-D structure 63b having curved cross-sections as a 3-D structure formed on the second surface 61b. The second 3-D structure 63b may be formed into a columnar shape having a ridge line along the same direction as the first 3-D structure 63a or may be formed into a two-dimensional dotted manner in a plane of the second surface 61b. Further, as the 3-D structure 63b, a depressed shape may be formed on the second surface 61b in addition to the example in which the protruded shape is formed on the second surface 61b.

The optical sheet 52 of this embodiment is structured so that X2, Y2, and Z2 satisfy the following relationships:

$$0.1 \leq X2/Z2 \leq 3 \quad (4)$$

$$0.01 \leq Y2/Z2 \leq 3 \quad (5)$$

$$(X2+Y2)/Z2 \leq 4 \quad (6)$$

where X2 represents the height of the first 3-D structure 63a, Y2 represents the height of the second 3-D structure 63b, and Z2 represents the thickness obtained by subtracting the sum of X2 and Y2 from the thickness of the sheet main body 60.

The thickness of the optical sheet 52 (sheet main body 60) can be set to 10 μm or more and 2000 μm or less. By the sheet manufacturing apparatus 1 or 2, it is possible to manufacture, with high accuracy, the optical sheet having the 3-D structures that satisfy the above expressions (4) to (6) within the thickness range.

The 3-D structure 63b having the above shape can have a predetermined lens function on the second surface 61b. In addition, by finely forming the 3-D structure 63b, the second surface 61b is allowed to have an antireflective function. As a result, by setting the second surface 61b as a light incident surface, an optical sheet with less light reflection loss can be formed. The optical sheet 52 of this embodiment can also be used as the optical sheet that is incorporated in the backlight unit for the liquid crystal display apparatus.

<Fifth Embodiment>

Figure 5:
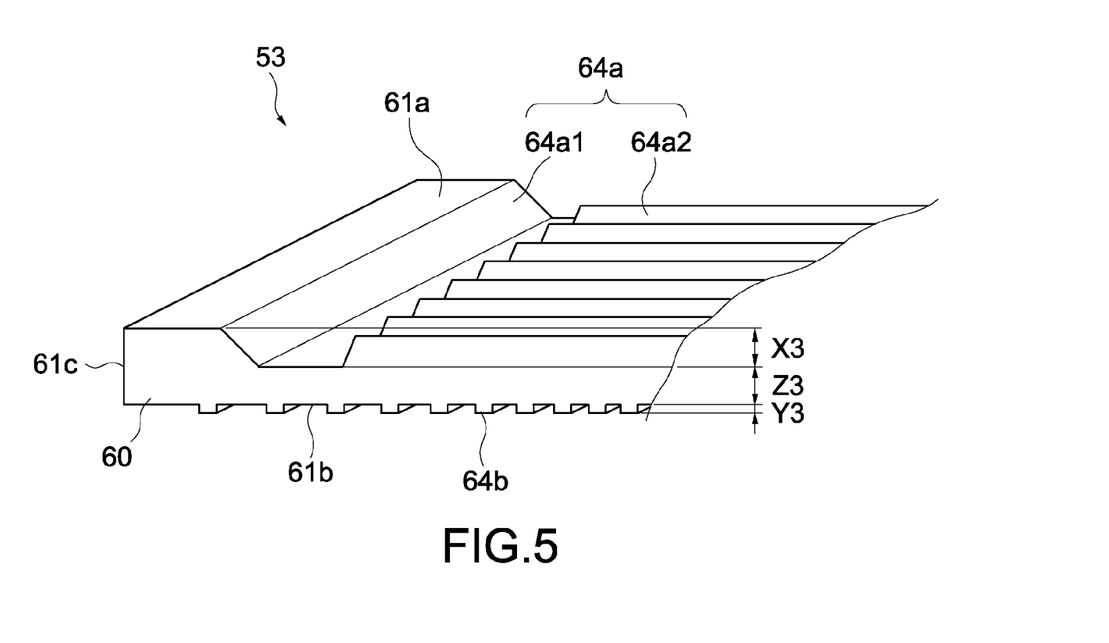
FIG. 5 is a schematic perspective view showing a main part of an optical sheet according to another embodiment.

FIG. 5 is a schematic perspective view showing an optical sheet 53 according to a fifth embodiment. The optical sheet 53 of this embodiment includes a first 3-D structure 64a and a second 3-D structure 64b. The first 3-D structure 64a is formed on the first surface 61a of the sheet main body 60, and the 3-D structure 64b is formed on the second surface 61b.

In this embodiment, the first 3-D structure 64a includes a step-shaped part 64a1 and a prism-shaped part 64a2. The step-shaped part 64a1 is constituted of a tapered portion and a flat portion. On the flat portion, a predetermined geometric shape may be formed in a plane thereof. That is, the first 3-D structure 64a according to this embodiment has the two or more kinds of shapes. As a result, an optical sheet that has a demanded shape and desired optical characteristics can be provided.

On the other hand, the second 3-D structure 64b according to this embodiment is formed of a plurality of protruded portions having approximately rectangular cross-sections. The plurality of protruded portions are formed on the second surface 61b so as to have a predetermined distribution. The protruded portion is not limited to have the above-mentioned shape, but may be a hemispheric protruded portion. In the example of FIG. 5, the plurality of protruded portions are formed at arrangement intervals that become gradually shorter (that is, are formed at a gradually higher formation density) in a direction from a side surface 61c of the sheet main body 60 to the other side surface (not shown) opposed thereto. The protruded portions are formed in a dotted manner on the second surface 61b, but are not limited to this. The protruded portions may have a linear shape that is extended in a direction perpendicular to a ridge-line direction of the prism-shaped part 64a2. In addition, the second 3-D structure 64b is not limited to be formed in the protruded manner with respect to the second surface 61b, but may be formed in a depressed manner.

The optical sheet 53 of this embodiment is structured so that X3, Y3, and Z3 satisfy the following relationships:

$$0.1 \leq X3/Z3 \leq 3 \quad (7)$$

$$0.01 \leq Y3/Z3 \leq 3 \quad (8)$$

$$(X3+Y3)/Z3 \leq 4 \quad (9)$$

where X3 represents the height of the first 3-D structure 64a, Y3 represents the height of the second 3-D structure 64b, and Z3 represents the thickness obtained by subtracting the sum of X3 and Y3 from the thickness of the sheet main body 60. It should be noted that X3 that represents the height of the first 3-D structure 64a corresponds to the height of the step-shaped part that forms the maximum height.

The thickness of the optical sheet 53 (sheet main body 60) can be set to 10 μm or more and 2000 μm or less. By the sheet manufacturing apparatus 1 or 2, it is possible to manufacture, with high accuracy, the optical sheet having the 3-D structures that satisfy the above expressions (7) to (9) within the thickness range.

The optical sheet 53 of this embodiment is also manufactured by using the sheet manufacturing apparatus 1 or 2. By the sheet manufacturing apparatus 1 or 2, the resin sheet whose respective surfaces have different shapes can be formed with high accuracy. In particular, the optical sheet 53 of this embodiment can be used as a light guide plate of an edge light type. The side surface 61c can be formed as a light incident surface to which a light source such as a light-emitting diode and a fluorescent tube is provided. With this structure, it is possible to obtain a light guide plate that is thinner than a light guide plate manufactured using an injection molded body in related art.

In the above, the embodiments are described. However, the present application is not limited to the above embodiments, of course, and can be variously modified on the basis of the technical idea of the present application.

For example, in the above embodiments, the light guide plate or the various optical sheets incorporated into the backlight unit for the liquid crystal display apparatus are given as the example of the optical sheet. Instead, the present application can be applied to various optical sheets used for other image display apparatuses such as a liquid crystal projector apparatus and a 3-D image display apparatus.

Further, for example, in the above embodiments, as the means for heating the resin sheet to the transfer temperature, the heating rollers 12 and 22 are used, but are not limited to those. Another heating system such as an infrared-ray heating may instead be used. In addition, to enhance the rapid cooling effect of the resin sheet, the cooling rollers 13 and 23 can be structured in a plurality of stages.

Furthermore, in the second embodiment, the center of rotation of the second heating roller 22 is set on the extended straight line that likes the center of rotation of the first heating roller 12 and the center of rotation of the first cooling roller 13 with each other. It is also possible to change the set position as appropriate in accordance with the peeling property of the resin sheet, for example. That is, the position of the second heating roller 22 is not particularly limited, and may be disposed outside of the extended line.

The present application contains subject matter related to that disclosed in Japanese Priority Patent Application JP 2009-220438 filed in the Japan Patent Office on Sep. 25, 2009, the entire content of which is hereby incorporated by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet manufacturing method, comprising:
   forming a first three-dimensional structure on a first surface of a resin sheet using a first master heated to a first temperature;
   forming, while cooling the first surface, a second three-dimensional structure on a second surface of the resin sheet, wherein the second surface is a reverse side to the first surface and the first surface is cooled to a second temperature lower than the first temperature, using a second master heated to a third temperature higher than the second temperature; and
   cooling the second surface to a fourth temperature lower than the third temperature.

2. The optical sheet manufacturing method according to claim 1,
   wherein the second three-dimensional structure is formed on the second surface, and the first master is subsequently peeled from the first surface.

3. The optical sheet manufacturing method according to claim 2,
   wherein the first master is formed of a first endless belt on a surface of which a shape corresponding to the first three-dimensional structure is formed, and is run between a first heating roller and a first cooling roller, the first heating roller being capable of being heated to the first temperature, the first cooling roller being capable of being cooled to the second temperature, and
   wherein the second master is formed of a second endless belt on a surface of which a shape corresponding to the second three-dimensional structure is formed, and is run between a second heating roller and a second cooling roller, the second heating roller being capable of being heated to the third temperature, the second cooling roller being capable of being cooled to the fourth temperature;
   the first cooling roller being opposed to the second heating roller through the resin sheet.

4. The optical sheet manufacturing method according to claim 1,
   wherein the resin sheet is made of a transparent thermoplastic resin.

5. The optical sheet manufacturing method according to claim 4,
   wherein the resin sheet is made of a crystalline resin.

\* \* \* \* \*